United States Patent
Besling et al.

(10) Patent No.: US 9,726,561 B2
(45) Date of Patent: Aug. 8, 2017

(54) DIFFERENTIAL PRESSURE SENSOR WITH A CAPACITIVE READ OUT SYSTEM

(71) Applicant: ams International AG, Rapperswil-Jona (CH)

(72) Inventors: Willem Frederik Adrianus Besling, Eindhoven (NL); Iris Bominaar-Silkens, Valkenswaard (NL); Remco Henricus Wilhelmus Pijnenburg, Hoogeloon (NL); Marten Oldsen, Kleve (DE)

(73) Assignee: ams International AG, Rapperswil-Jona (CH)

( * ) Notice: Subject to any disclaimer, the term of this patent is extended or adjusted under 35 U.S.C. 154(b) by 505 days.

(21) Appl. No.: 14/266,281

(22) Filed: Apr. 30, 2014

(65) Prior Publication Data
US 2014/0338459 A1    Nov. 20, 2014

(30) Foreign Application Priority Data

May 20, 2013    (EP) .................................... 13168442

(51) Int. Cl.
*G01L 9/00*    (2006.01)
*G01L 9/12*    (2006.01)
(Continued)

(52) U.S. Cl.
CPC ............ *G01L 9/005* (2013.01); *G01L 9/0073* (2013.01); *G01L 9/125* (2013.01); *G01L 13/025* (2013.01); *G01L 19/147* (2013.01); *G01L 19/148* (2013.01)

(58) Field of Classification Search
None
See application file for complete search history.

(56) References Cited

U.S. PATENT DOCUMENTS

| | | | |
|---|---|---|---|
| 4,730,496 A | | 3/1988 | Knecht et al. |
| 6,431,003 B1 | * | 8/2002 | Stark ............... G01L 9/0073 73/718 |

(Continued)

FOREIGN PATENT DOCUMENTS

| | | |
|---|---|---|
| DE | 100 62 637 A1 | 7/2002 |
| WO | 98/26261 A1 | 6/1998 |

OTHER PUBLICATIONS

Cheng, Ya, et al; "3D Microstructuring Inside Foturan Glass by Femtosecond Laser"; Riken Review No. 50: Focused on Laser Precision Microfabrication (LPM 2002); pp. 101-106 (Jan. 2003).

(Continued)

*Primary Examiner* — Peter Macchiarolo
*Assistant Examiner* — Jermaine Jenkins
(74) *Attorney, Agent, or Firm* — McDermott Will & Emery LLP (57) ABSTRACT

A differential pressure sensor comprises a cavity having a base including a base electrode and a membrane suspended above the base which includes a membrane electrode, wherein the first membrane is sealed with the cavity defined beneath the first membrane. A first pressure input port is coupled to the space above the sealed first membrane. A capacitive read out system is used to measure the capacitance between the base electrode and membrane electrode. An interconnecting channel is between the cavity and a second pressure input port, so that the sensor is responsive to the differential pressure applied to opposite sides of the membrane by the two input ports.

12 Claims, 11 Drawing Sheets

(51) Int. Cl.
  *H01G 7/00*    (2006.01)
  *G01L 7/08*    (2006.01)
  *G01L 13/02*   (2006.01)
  *G01L 19/14*   (2006.01)

(56) References Cited

U.S. PATENT DOCUMENTS

| | | |
|---|---|---|
| 7,273,763 B1 | 9/2007 | Neumeier et al. |
| 7,497,134 B2 * | 3/2009 | Renken ................... G01L 1/148 |
| | | 73/862.68 |
| 7,698,952 B2 * | 4/2010 | Renken ................ G01L 9/0073 |
| | | 73/780 |
| 8,409,901 B2 * | 4/2013 | El-Gamal ........... B81C 1/00301 |
| | | 257/E21.575 |
| 9,207,140 B2 * | 12/2015 | Sgourakes ............ G01L 13/025 |
| 2013/0233086 A1 * | 9/2013 | Besling .................... G01L 9/12 |
| | | 73/724 |
| 2013/0316830 A1 | 11/2013 | Sedzin et al. |
| 2014/0070337 A1 | 3/2014 | Besling et al. |

OTHER PUBLICATIONS

Extended European Search Report for Application No. 13168442.5 (Jan. 22, 2014).

* cited by examiner

DIFFERENTIAL PRESSURE SENSOR WITH A CAPACITIVE READ OUT SYSTEM

CROSS-REFERENCE TO RELATED APPLICATIONS

This application claims the priority under 35 U.S.C. §119 of European patent application no. 13168442.5, filed on May 20, 2013, the contents of which are incorporated by reference herein.

This invention relates to differential pressure sensors.

A variety of apparatuses and systems need differential pressure sensors, that provide more functionality than simple on/off control. Examples are home and building automation for example for climate control, air conditioners for airflow and filter replacement, vacuum cleaners, white good applications for level sensing, automotive applications such as seat occupancy detection, crash detection, engine controls, and braking systems, and medical applications such as respirators, and blood pressure sensors.

Such systems often employ sensors with accurate and linear output to track changes in operation before those changes become critical. The single on/off condition of a switch status means it cannot be used in closed-loop systems for trend monitoring. Additional demand for electronic pressure sensors in preference to pressure switches is fuelled by the rapid development of microprocessor and microcontroller-based systems.

The emergence of silicon as a sensing material has influenced pressure measurement in industrial and commercial applications. Silicon-based sensors use a technology that has since become known as MEMS, or micro electro mechanical systems.

MEMS sensors have been employed in automotive and medical applications within benign environments. Compact in size, they can be relatively inexpensive in high-production volumes.

Most MEMS pressure sensors have a piezoresistive read-out that is able to determine the state of deflection of a suspended membrane. Also optical, capacitive, and resonance frequency based read-out circuits are known in the art.

Differential pressure is measured via deflection of the membrane due to a pressure difference between an external pressure and a gauge pressure which can be the ambient environmental pressure. The gauge pressure can also be a constant reference pressure. If the reference pressure is a vacuum an absolute pressure reading can be determined. Such type of sensor is called an absolute pressure sensor.

In theory, a differential pressure can be determined using two absolute pressure sensors, each connected to a different port. Each sensor measures a pressure difference between the external pressure applied to the pressure port of the sensor and the internal reference pressure inside a hermetically closed cavity which should be ideally vacuum or at least close to vacuum. However, this approach can be challenging to implement for a variety of reasons. For instance, signal drift may occur if gas pressure in the reference cavity is not stable, which can in turn require a high level of hermetic sealing of the membrane.

In addition, while thin or large-area membranes are desirable for deflection and sensitivity, it is difficult to make thin membranes hermetic. Out-gassing of layers in the reference cavity can require recalibration, and the temperature dependency of the cavity pressure (i.e., according to Boyle's law ($P*V=n*R*T$)) can cause issues. Furthermore, if the pressure in the cavity is near vacuum, the external pressure can significantly deform the membrane if the membrane spring constant is low, whereas membranes with a higher spring constant k reduce the sensitivity (which is proportional to $1/k$, k being proportional to the maximum pressure to be measured).

In addition, a large deflection induces significant non-linearity in the piezoresistive read-out circuitry. These and other matters have presented challenges to the implementation of pressure sensors, for a variety of applications.

In order to mitigate these issues when measuring a differential pressure, a suspended crystalline Si membrane has been proposed which is circumferentially anchored to a Si substrate. On top of this membrane, piezoresistive elements are deposited and patterned into strain gauges within a Wheatstone bridge configuration. The deflection of the Si membrane can be determined with an external readout circuit that is able to measure a small resistance change in the bridge. Underneath the suspended Si membrane the Si substrate material is removed by wet or dry etching techniques creating a microfluidic or gaseous connection through the Si substrate.

Inside the package mould two pressure ports are manufactured that make one connection to the upper side of the membrane and one to the lower side of the membrane. Although the membrane manufacturing approach is very robust and reproducible, the form factor is significant due to the use of a dual die solution for sensor and read-out. Furthermore, the packaging solution imposes challenges to the sealing of the pressure sensor die and the connection of one access port to the top of the die and the other access port to the bottom of the die.

Differential pressure sensors using the piezoresistive read-out principle are not integrated on top of ICs because the standard piezoresistive material (crystalline Si) cannot be deposited at low temperatures (i.e. below 400° C.) on top of CMOS.

The invention is defined by the claims.

According to the invention, there is provided a differential pressure sensor, comprising:

a cavity having a base including a base electrode and a first membrane suspended above the base which includes a membrane electrode, wherein the first membrane is sealed with the cavity defined beneath the first membrane;

a first pressure input port coupled to the space above the sealed first membrane;

a capacitive read out system for measuring the capacitance between the base electrode and membrane electrode;

an interconnecting channel between the cavity and a second pressure input port.

This arrangement provides two port connections to the area above and below the membrane. In this way, a differential pressure sensor is provided. The sensor can be integrated on top of an integrated circuit, used as the read-out circuit. There can be one or more pressure sensitive membranes, and they can be read out capacitively in an absolute manner or differentially.

The ability to integrate the pressure sensitive membrane on top of an integrated circuit enables a reduction in form factor, with a single die solution. This gives a reduction of expensive Si area compared to a "next to IC" option. This has significant implications to the design and operation of the sensor and the sensor read-out.

The invention in this way addresses previous difficulties, in particular:

1) Highly reliable monocrystalline Si cannot be used as the membrane material if the sensor is to be integrated onto an IC due to the high deposition temperature required for deposition of monocrystalline Si films.

2) By changing the membrane material it becomes less straightforward to use piezoresistive read-out. Crystalline Si is ideal because of its well-known piezoresistive constants in different crystallographic orientations, 3) Access to the back side of the membrane cannot be accomplished easily (e.g. expensive Through Silicon Via etching would be required adding process complexity and using extra space). The invention can be implemented with standard materials available in CMOS fab for cost effective manufacturing. Standard deposition tools can be used with recipes that do not exceed the maximum allowed temperature budget during processing, 4) The capacitive sensor read-out can be arranged to have ultra-low power consumption and can have higher sensitivity than the piezoresistive read-out.

5) The arrangement can have access ports to the top of the CMOS die to facilitate packaging and connection to the pressure ports. The package can fan out two pressure ports on one die.

The first pressure input port is preferably above the location of the cavity.

In a most simple implementation, the cavity connects directly to the second pressure port by a lateral channel.

A preferred alternative is to use a second cavity to the side of the cavity, with the cavity and the second cavity interconnected by the interconnection channel, wherein the second cavity comprises a second membrane which has at least one opening, wherein the at least one opening is coupled to the second pressure input port.

This second cavity is thus interconnected to the first cavity, and it enables a second pressure input port to be defined. The opening means that the second cavity is not sealed so that the second pressure port can be above the second cavity.

The plan view area of the first cavity can be larger than the plan view area of the second cavity. The second cavity can in this case only function as an interconnection mechanism to couple from the cavity area within the device to a port on top of the device.

The second cavity can instead have a base including a second base electrode and the second membrane includes a second membrane electrode, wherein the capacitive read out system is for measuring the capacitance between the base electrode and membrane electrode and for measuring the capacitance between the second base electrode and the second membrane electrode.

In this way, a capacitance signal is obtained from both cavities. This enables a differential capacitance readout.

The plan view area and shape of the first cavity can be the same as the plan view area and shape of the second cavity. By having the two cavities the same, a differential readout provides compensation, for example for temperature variations.

The invention also provides a sensor arrangement, comprising:

an integrated circuit; and a sensor of the invention provided over the integrated circuit.

The integrated circuit can comprise a CMOS circuit, with a top metal layer, wherein the base electrode of the cavity connects to the top metal layer through vias to form an electrical connection to the base electrode.

The membrane electrode of the cavity can also connect to the top metal layer through vias to form an electrical connection to the membrane electrode.

A sealing layer is preferably provided over the membrane of the cavity, and a port arrangement can then be provided over the sealing arrangement, wherein the port arrangement comprises a lid (e.g. glass) having a recess which sits over the first cavity area, and the first pressure input port is coupled to the recess. The glass lid can define the two pressure ports, and it can provide a fan out function.

The glass lid can have a second recess which sits over the second cavity area, and the second pressure input port is coupled to the second recess.

Examples of the invention will now be described in detail with reference to the accompanying drawings, in which.

The invention provides a differential pressure sensor comprising a cavity having a base including a base electrode and a membrane suspended above the base which includes a membrane electrode, wherein the first membrane is sealed with the cavity defined beneath the first membrane. A first pressure input port is coupled to the space above the sealed first membrane. A capacitive read out system is used to measure the capacitance between the base electrode and membrane electrode. An interconnecting channel is between the cavity and a second pressure input port, so that the sensor is responsive to the differential pressure applied to opposite sides of the membrane by the two input ports.

Figure 1:
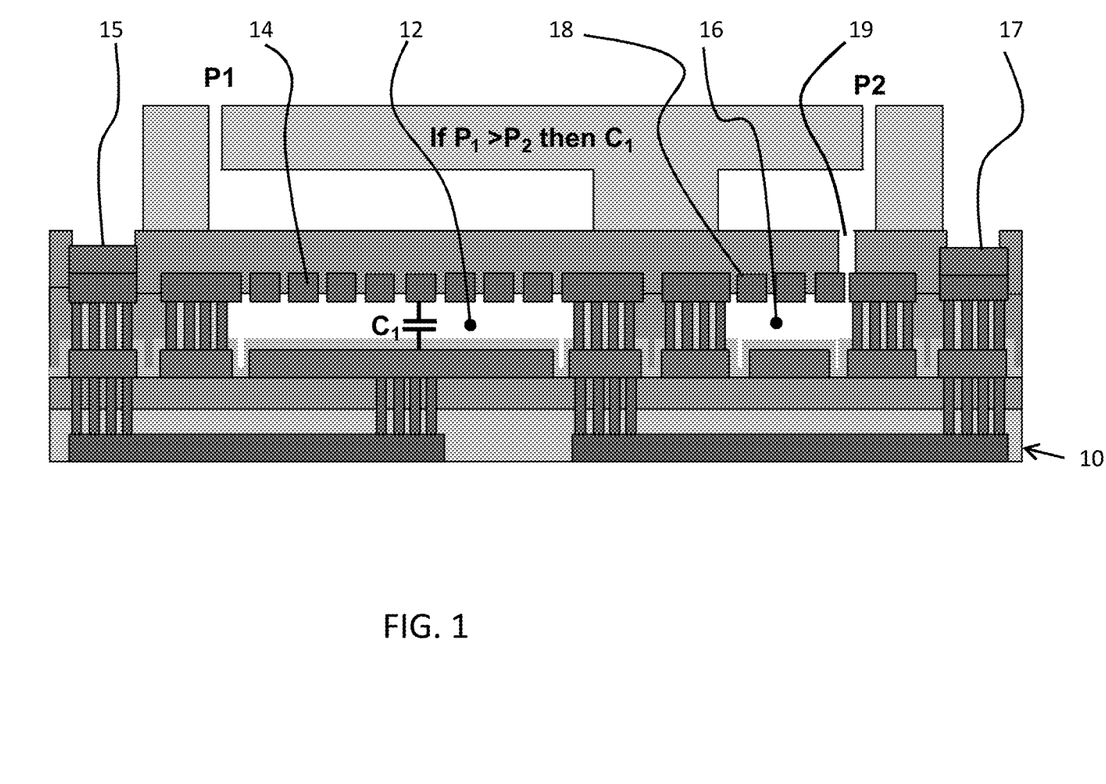
FIG. 1 shows a first example of differential pressure sensor of the invention.

FIG. 1 shows a cross section of a first example of differential sensor of the invention with two access ports to environment P1, P2.

The sensor is formed over an integrated circuit, the top metallization layer of which is shown as 10. The sensor comprises a substrate having a cavity 12, a first suspended membrane 14 overlying the cavity that forms a wall of a chamber at least partially in the cavity and deflects due to a small pressure difference between the two port pressures P1, P2.

An elongated channel (not visible in FIG. 1) connects the chamber 12 to a second cavity section 16 that is in contact with an outside pressure P2. The second cavity has a membrane 18 which has a vent hole 19.

A capacitive sensor associated with the first cavity 12 detects a change in the state of deflection of the first membrane 14. A first pressure port P1 is provided to the section above the first membrane 14 and a second pressure port P2 is provided to the second cavity section 16.

The second cavity 16 has a plurality of openings that allows gas to flow into the first cavity via the elongated channel. If a positive pressure difference exists between first pressure port and second pressure port the first membrane 14 will deflect towards the bottom of the first cavity 12. If a negative pressure difference exists between first pressure port and second pressure port the first membrane 12 will deflect upwards, i.e. away from the bottom of the cavity.

A single or a plurality of electrodes integrated in the bottom of the first cavity and in the membrane overlying the cavity allow detection of small capacitance changes that can be related to a differential pressure.

The top and bottom electrodes route to external contacts 15,17 on top of the structure using the top metal layer of the IC to form interconnects.

Figure 2:
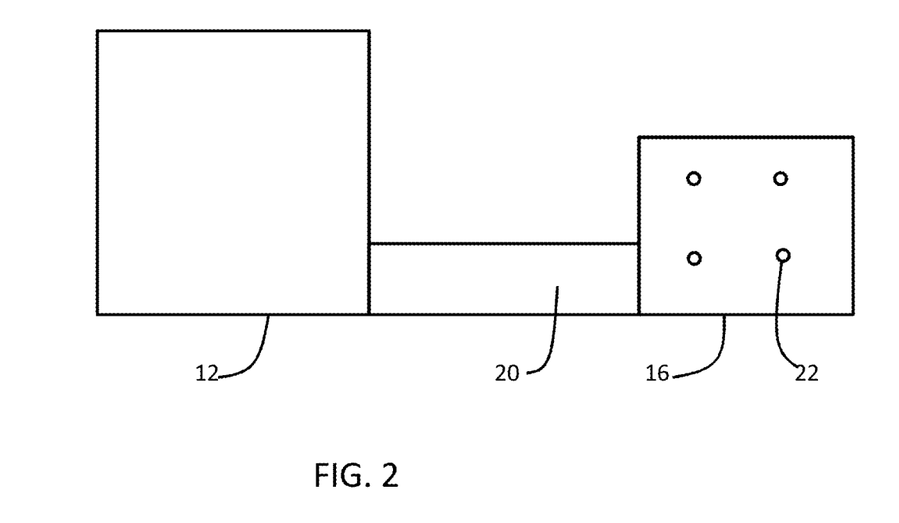
FIG. 2 shows the sensor of FIG. 1 in plan view.

FIG. 2 shows a top view of the differential pressure sensor with access ports to the environment.

The main cavity 12 has a sealed membrane. The cavity connects via passage 20 to the second cavity 16. This has a membrane with vent openings 22 so that the cavity 16 and therefore the interconnected cavity 12 is at the pressure which exists at the port P2.

In this example, the second cavity is used to provide an interface between the first cavity and an external pressure port P2 which is spaced from the first pressure port P1, so that a differential pressure can be measured. The second cavity is smaller than the first in the example shown.

Figure 3:
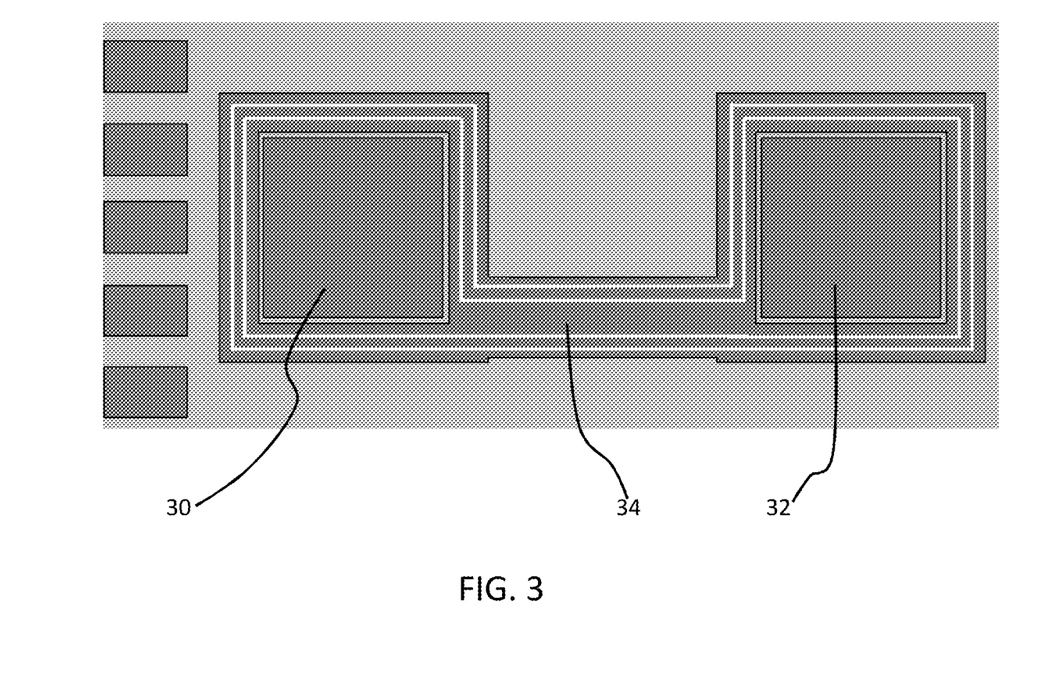
FIG. 3 shows a second example of differential pressure sensor of the invention in plan view.

A second example is shown in plan view in FIG. 3. This uses differential capacitive read-out between two identical cavities 30, 32 to determine a differential pressure. The two identical cavities 30, 32 are manufactured with overlying membranes that are again interconnected with an elongated channel 34. The membrane overlying the first cavity 30 is sealed, whereas the membrane overlying the second cavity 32 has at least one opening.

The differential capacitance of the sealed membrane and the opened membrane is a direct measure of the differential pressure. This approach allows to measure very small changes in the membrane deflection while being able to cancel out temperature effects, due to a small thermal expansion coefficient mismatch of the membrane and the substrate and/or to correct for possible membrane stiffening during extended operation.

As in the example above, the first membrane has a pressure difference across it of the difference between P1 and P2. However, although there is no significant pressure difference across the second membrane, by measuring the differential capacitance, there is automatic correction for parameters which influence the membrane behaviour equally such as temperature and processing conditions.

The capacitive read out of the main cavity may include a differential read out system, based on multiple bottom electrodes beneath that single cavity. For example, two interdigitated combs can be provided between which a capacitance is measured. The top electrode is then connected to ground to shield the differential capacitive sensor from electromagnetic interference effects. Upon deflection of the top electrode/membrane the fringe capacitance between the interdigitated combs is altered which can be related to a differential pressure between the two pressure inlet ports.

An alternative capacitive read out can be based on a parallel plate capacitive read-out system using a single or plurality of bottom electrodes and an overlying top electrode that is incorporated in the membrane. Upon deflection of the top electrode/membrane the capacitance between the two plates is altered which can be related to a differential pressure between the two pressure inlet ports. The cap overlying the Si die and creating the two pressure inlet ports is then metallized either on the inside or on the outside and connected to ground to shield the circuit from electromagnetic interference effects.

Another example based on a parallel plate capacitive read-out (using a single or plurality of bottom electrodes) can have an overlying membrane with an integrated intermediate electrode and an overlying capping layer with a fixed top electrode. Upon deflection of the pressure sensitive membrane towards the bottom electrode the capacitance is increased between the intermediate electrode and the bottom electrode while at the same time the capacitance is reduced between the fixed top electrode and the intermediate membrane. This approach allows determination of positive and negative differential pressures with comparable accuracy if the gap height is identical. This means that the differential sensor can be reproducibly used irrespective of its pressure port orientation. In order to shield the circuit for electromagnetic interference effects the cap overlying the Si die and creating the two pressure inlet ports can be metallized on two sides: on the inside to create the fixed top electrode and on the outside to connect to ground.

Figure 4:
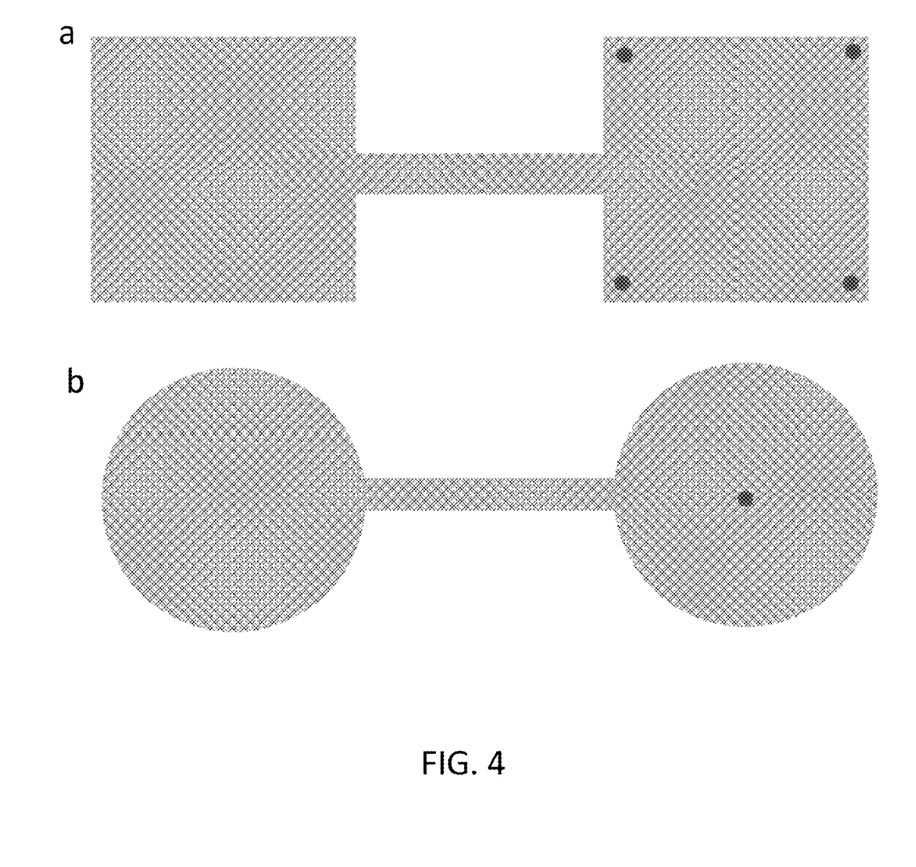
FIG. 4 shows further examples of differential pressure sensor of the invention.

FIG. 4 shows further examples having a plurality of membranes.

FIG. 4a shows a square membrane over a cavity which is sealed and connected to the cavity of the second membrane which has four access holes to the environment.

FIG. 4b shows an example of a circular membrane over a cavity which is sealed and connected to the cavity of the second membrane which has a single access hole to the environment.

Figure 5:
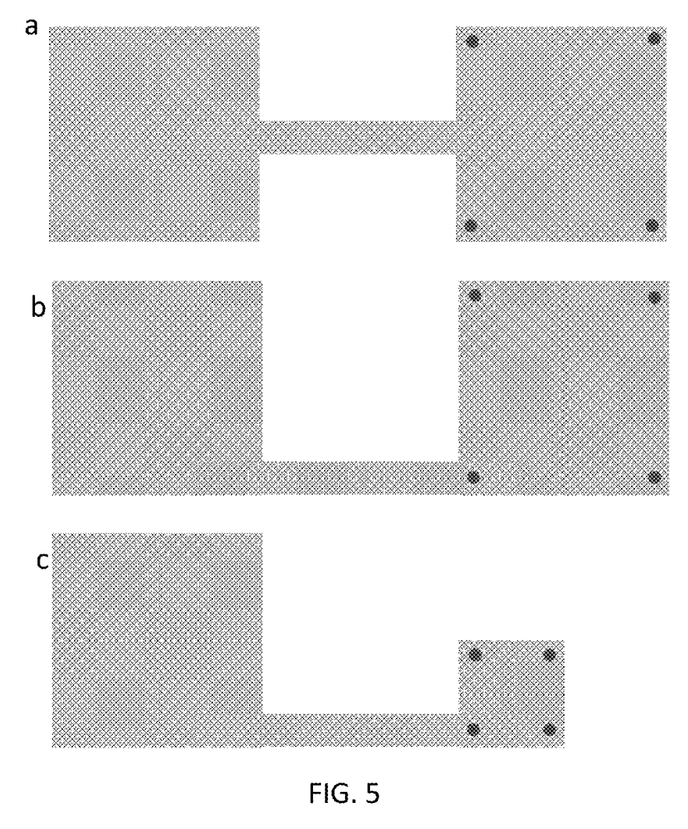
FIG. 5 shows different ways to interconnect the sensor parts within the differential pressure sensor of the invention.

FIG. 5 shows three different configurations of the connections between two square membranes. The length of the connecting trench does not need to have the same scale as the membrane.

FIG. 5a has a connection between the centres of two facing sides of the two membranes. FIG. 5b has a connection along the bottom of two facing sides of the two membranes.

FIG. 5c shows a configuration where the dimension of the second membrane is smaller than the first, and with the connection along the bottom of two facing sides of the two membranes.

Figure 6:
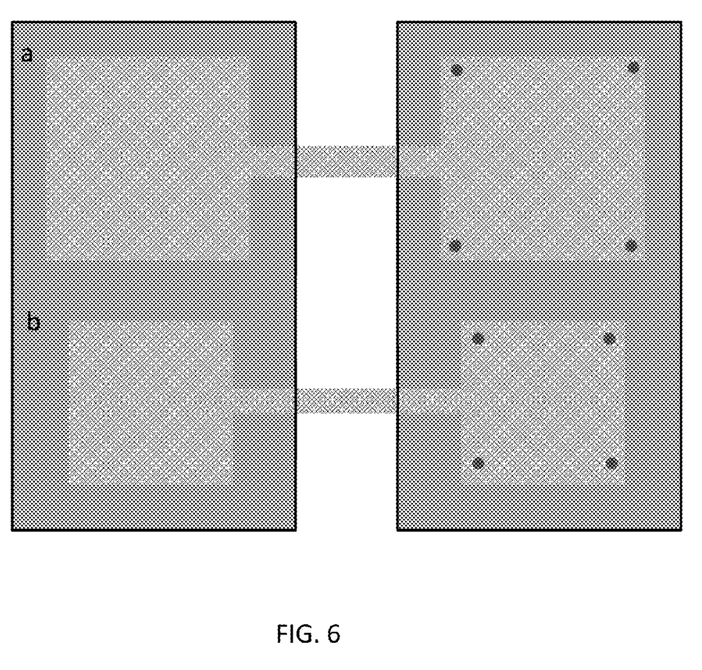
FIG. 6 shows different sensor dimensions used within a single device.

FIG. 6 shows a configuration of an array of two membrane pairs with different membrane sizes. The top pair of connected membranes are larger than the bottom pair of connected membranes. This approach allows measurement reliably in different pressure regimes. A large membrane (the structure of FIG. 6a) can be pushed into collapse at a relatively small differential pressure whereas a smaller membrane is still not touching the bottom electrode (the structure of FIG. 6b). The former has a much higher sensitivity but a smaller differential pressure range that can be measured, whereas the latter has a lower sensitivity but a larger range.

By using a switch matrix, a selection can be made as to which membrane needs to be measured depending on the required accuracy and differential pressure range.

As an example of different shapes, the membrane can be circular, square, rectangular, or polygonal with straight or rounded corners.

Examples are given in FIGS. 7a to l.

Figure 7:
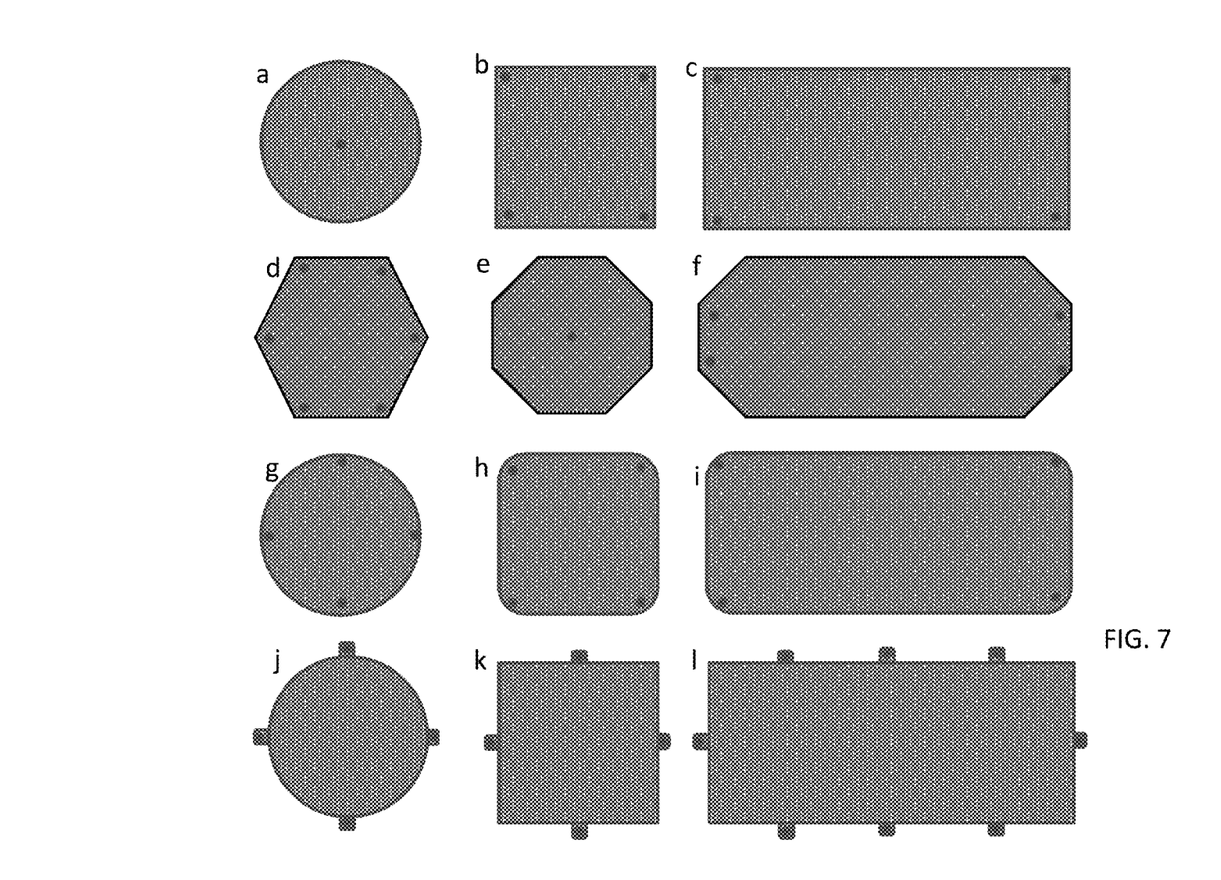
FIG. 7 shows various different possible membrane shapes for use in the sensor of the invention.

The membranes can be ordered into arrays and connected in parallel to increase the capacitance, and capacitance change for a certain applied pressure. The access holes can be located on the edge, in the center of the membrane, or distributed over the surface of the membrane. Various options are shown in FIG. 7.

The bottom electrode can be made smaller than the actual membrane size to optimise signal to noise ratio and or to adapt the capacitance range to the read-out circuit in an efficient way. The bottom electrode can be omitted from the second membrane. The bottom electrode can also be segmented to improve shielding and or to perform differential measurements.

Figure 8:
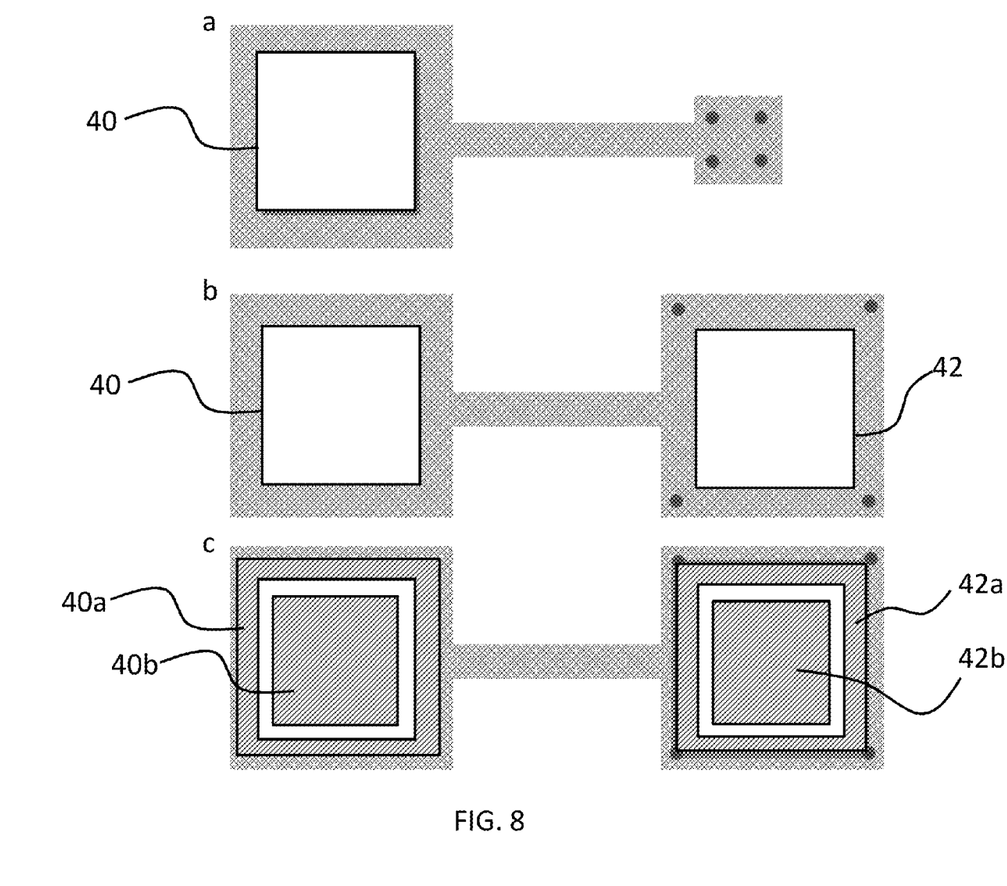
FIG. 8 shows various different possible electrode arrangements for use in the sensor of the invention.

FIG. 8(a) shows the main membrane with a smaller bottom electrode 40 than the membrane size, and a smaller vented membrane with no bottom electrode.

FIG. 8(b) shows the main membrane with a smaller bottom electrode 40 than the membrane size, and a same size vented membrane with a bottom electrode 42. The venting is in the corners outside the area of the bottom electrode.

FIG. 8(c) shows the main membrane with a segmented bottom electrode design with concentric outer and inner electrodes 40a,40b, and with the same electrode design of concentric outer and inner electrodes 42a,42b in the vented membrane 80 than the membrane size, and a same size vented membrane with a bottom electrode. The venting is in the corners outside the area of the bottom electrode.

The pressure sensor can have a glass capping layer. This is rigid enough to provide adequate physical protection for the components provided on the semiconductor substrate. The glass can be selected to have similar thermal expansion characteristics to the material (typically silicon) used to form the substrate. Certain kinds of glass can be doped with photosensitive compounds. After illumination using a mask or a focused laser the illuminated material transforms into crystalline material that is being etched much quicker than the part that is not illuminated and is still amorphous. Subsequently the glass can be etched selectively by a wet etch removing the illuminated part. This allows the possibility of forming the channels and cavities described above.

Figure 9:
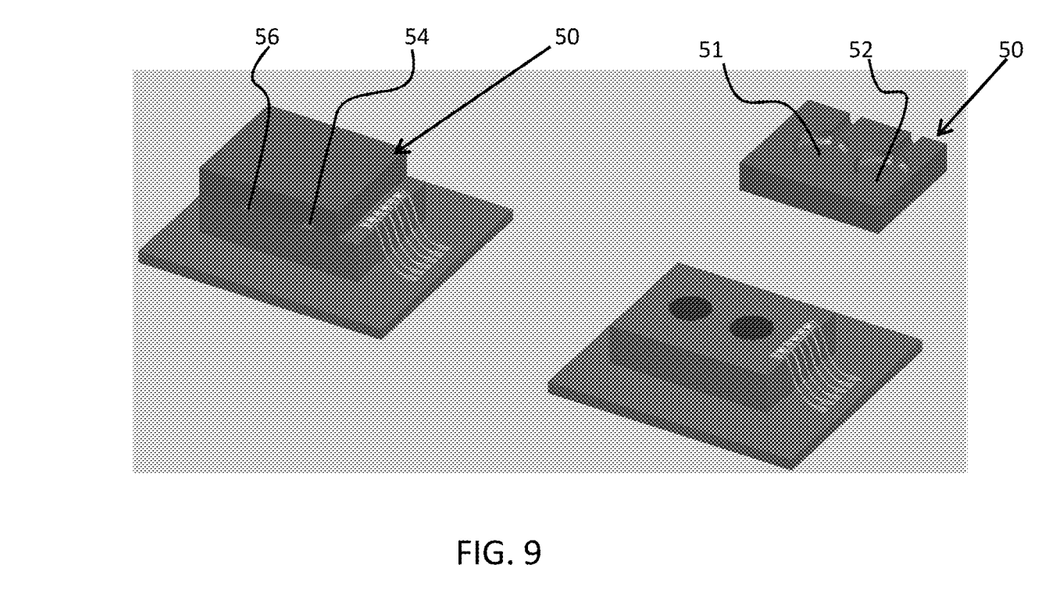
FIG. 9 shows a possible packaging approach.

FIG. 9 shows example of glass cap 50 laser bonded to a Si die with two separated cavities 51,52 etched in the glass. The glass is used as a fan out package to be able to measure a differential pressure over two macroscopic pressure ports 54,56 located on the edge of the sensor die. The holes can also be etched on the top.

An example of such a glass, and the laser aided etching process that can be used, is described by Cheng et al. in an article entitled "3D Microstructuring Inside Foturan Glass by Femtosecond Laser", published in RIKEN Review No. 50 (January, 2003): Focused on Laser Precision Microfabrication (LPM 2002), pp. 101-106.

A further advantage of such a glass is that it can be fused to the underlying SiN or $SiO_2$ passivation layers using a focused laser beam creating a hermetic interface between the Si die and the glass at relative low temperatures.

Also other capping materials can be used that can be patterned with standard lithographic etching recipes (e.g. Si or quartz wafers). Recesses, slits, trenches, and even high aspect ratio vias can be etched using Deep Reactive Ion Etching (DRIE) technique. Large area, low cost etching of Si wafers can be done using KOH.

Functional metallization is possible to allow making contacts through the wafer (Through Silicon Vias). The thermal expansion coefficient is identical to the CMOS substrate. The wafers are connected to each other using direct bonding, plasma activated bonding, anodic bonding, eutectic bonding, glass frit bonding, adhesive bonding, thermo-compression bonding, and/or reactive bonding creating a hermetically sealed cavity if no vias are being employed. The surface flatness and cleanliness of the interface, the bonding temperature, ambient pressure, and applied pressure are important parameters during sealing.

A variety of approaches can be used to manufacture the sensor apparatus as described above.

Figure 10:
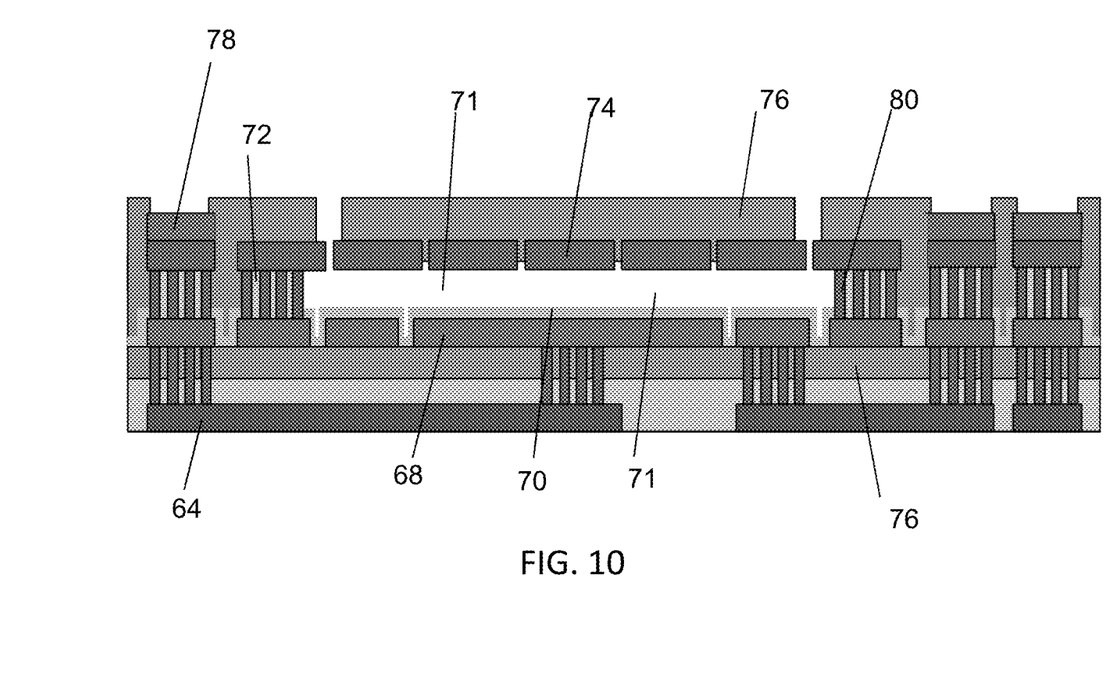
FIG. 10 is used to explain a possible manufacturing method for the sensor of the invention.
Figure 11:
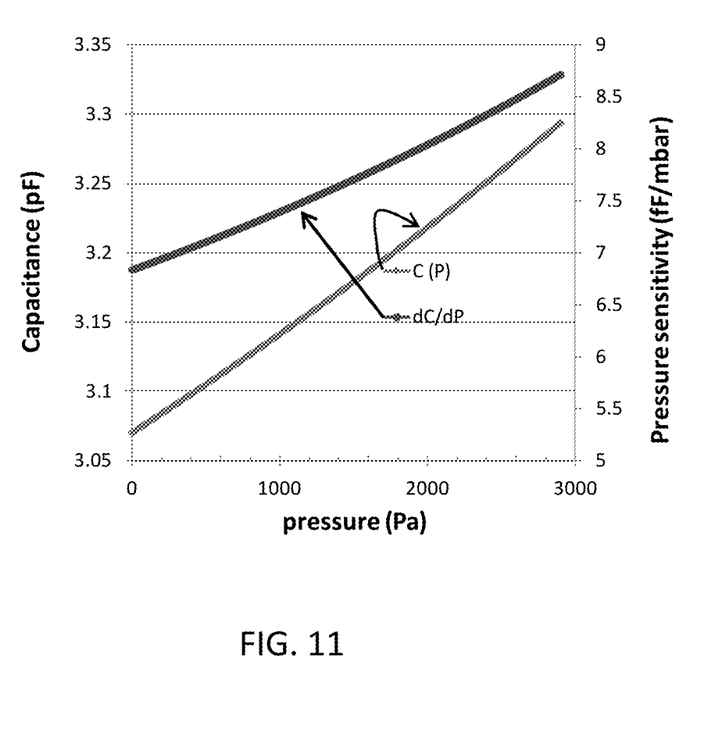
FIG. 11 shows the performance of an example of differential sensor of the invention.

FIG. 10 shows a cross section of a sensor on top of a CMOS Integrated circuit. It shows a cross section of a segmented bottom electrode design, and only for the vented membrane with the access holes around the edge. Thus, FIG. 10 shows a structure corresponding to the right hand part of FIG. 8c. Only the vented cavity is shown, as the figure is used only to describe the manufacturing method in general. As can be seen from FIG. 1, the upper and lower electrodes for the two cavities (if indeed they both have electrodes) are formed from the same layers, and the cavities are formed by sacrificial etching of the same layer. The two cavity membranes are also defined from a shared layer (or layer structure).

One example can use a tungsten (W) membrane and a silicon oxide sacrificial layer. In FIG. 10, the structure is provided over a processed CMOS wafer in which the CMOS back end includes a top metal layer 64. The sensor is provided over the CMOS back end with a passivation layer 66 between.

The pressure sensor comprises a planar lower electrode which in this example comprises an Al layer 68 with a Si-rich SiN or a silicon carbide capping layer 70. However, a Ti/TiN or tungsten bottom electrode may be used as well. The lower electrode connects to the CMOS top metal layer by means of standard interconnect vias.

The top and bottom electrodes are spaced by a sacrificial oxide 71 which is removed later on in the processing in the regions between the capacitor electrodes.

By forming the pressure sensor on top of an integrated circuit, such as CMOS circuits, a fully integrated solution results. The top metal layer 64 of the CMOS circuit can be used to as a shielding plate for the overlying bottom electrode and also to enable the formation of interconnects.

The integration on CMOS allows eliminating bond wires, which reduces parasitic capacitances. Electrical connection to the pressure sensor bottom electrode is also accomplished via the metal interconnect 64 that lies below the bottom electrode. For this purpose, vias extend through the passivation layer 66 below the bottom electrode as shown, and these then also extend up through the passivation layer 66 and the oxide 72 to connect to contact pads 78 at the top of the structure.

Top contact pads can be used for the inputs and outputs of the circuit.

In FIG. 1, contact pads 15,17 are shown that are in contact with the top and bottom capacitor electrodes (through a lateral connection in the top metal layer). However, direct contact in this way is not necessary and the capacitor electrodes can instead make contact only to the underlying IC for signal processing. The contact pads are then used for the IC inputs and outputs.

A tungsten top electrode 74 and a dielectric sealing layer 76 are provided. The top electrode can also comprise of titanium-tungsten, titanium, titanium nitride, aluminium, SiGe and/or a combination of the above mentioned materials. Deposition methods for the electrodes 64, 68, and 74 may comprise of Physical Vapour Deposition, High density plasma Sputtering, Plasma Enhanced Chemical Vapour Deposition (PECVD), Chemical Vapour Deposition (CVD), and Atomic Layer Deposition (ALD).

The sealing layer 76 is deposited after the sacrificial oxide removal, and it is used to fill partially or completely the sacrificial etch openings which are formed over the cavity area of the pressure sensor. The aim is to reduce the diameter and or the number of venting holes in the membrane and to electrically passivate the top electrode from its surroundings. The membrane can also be completely sealed and then opened again at selected spots to create the venting holes. The sealing layer can comprises of silicon dioxide, silicon nitride, or a stacked combination of these materials. Deposition methods for silicon oxide are high density plasma oxide (HDP oxide), Plasma Enhanced Chemical Vapour Deposition (PECVD), Chemical Vapour Deposition (CVD), and Atomic Layer Deposition (ALD).

Aluminium contact pads 78 provide the required connections to the device. W-filled vias extend down from the top aluminium contact pads to the bottom electrode layer, and also from the bottom electrode layer to the CMOS top metal layer as desired, as outlined above. If a different material as top electrode is chosen, e.g. SiGe, the vias and anchor points are consequently filled with SiGe.

An isolation layer 70 is provided to prevent shorts between the top and bottom electrodes and to avoid etching of the underlying passivation layer 66 by the sacrificial HF vapour etch. Si-rich SiN, SiN and SiC can be used as etch stop and passivation layer.

Vias are used not only as electrical connection paths, but also to form anchors 80. The anchors serve as an etch stop guard ring around the cavity but also are used to make contact of the top electrode to the underlying electronics.

There are numerous possible variations to the process flow. For example, a Si-rich SiN layer can be provided under the bottom electrode as etch stop layer instead of a standard SiN passivation layer. In order to prevent shorts between the top and bottom electrode an isolation or anti-shorting layer can instead be provided on top of the sacrificial oxide layer, or there may be a Si-rich SiN layer both beneath and above the sacrificial etch oxide. One of these layers can be patterned to device anti-stiction bumps.

When a Si-rich SiN layer is provided on top of the sacrificial oxide layer, it can become a support layer for the top metal electrode to avoid buckling.

The table below shows the typical geometrical dimensions of the sensor and properties with a dedicated read-out circuit (some example for circular membranes).

| Property | | min | typical | max |
| --- | --- | --- | --- | --- |
| Membrane radius | um | 150 | 200 | 250 |
| Thickness of isolation layer on electrode | nm | 50 | 200 | 300 |
| Gap height (sacrificial layer thickness) | nm | 200 | 300 | 500 |
| Sealing thickness | nm | 700 | 1000 | 1500 |
| Young's modulus of seal | GPa | 70 | 180 | 220 |
| Stress of seal | MPa | −100 | −200 | −300 |
| Metal electrode thickness | nm | 400 | 500 | 600 |
| Youngs modulus of metal | GPa | 400 | 410 | 420 |
| Stress of metal | MPa | 900 | 1000 | 1250 |
| C (0 bar) | pF | 2.8 | 3.2 | 3 |
| Collapse pressure | bar | 0.2 | 0.15 | 0.1 |
| Pressure sensitivity dC/dP | fF/mbar | 4 | 6 | 8 |
| Pressure range | mbar | 15 | 10 | 7 |
| Pressure resolution (assuming 16 bit ADC with 1 aF resolution: i.e. 65 fF C-range) | Pa | 0.02 | 0.012 | 0.01 |

For a membrane with typical geometrical dimensions and physical material parameters as expressed in the table above, pressure sensitivity results as shown in FIG. 7 can be obtained.

The sensor of the invention is applicable to a variety of different types of devices, systems and arrangements involving pressure sensing. While the present invention is not necessarily so limited, various aspects may be appreciated through a discussion of examples using this context.

Some applications can be based on micro electro mechanical systems (MEMS) type devices such as a MEMS sensor platform, MEMS absolute pressure sensor, MEMS differential pressure sensor or a MEMS gas sensor. Other applications include mobile phones and tablets (e.g., for use as differential pressure sensor to determine orientation, speed, and airflow, or for use as absolute pressure sensor to determine height or make weather predictions), stand-alone weather stations, GPS applications (e.g., elevation, dead reckoning), and altimeter watches, toys (e.g., airplanes, helicopters), gaming (e.g., for use as differential pressure sensor to determine orientation, speed, and airflow, or for use as absolute pressure sensor to determine height).

Automotive-based applications include tyre pressure monitoring systems (TPMS), seat occupancy detection, heating ventilation and air condition systems in cars, air bags, shock registration devices, exhaust and engine/fuel related pressure detection.

Other applications include environmental and smart building applications, such as for pressure detection in one or more of heating, ventilation, and air conditioning (HVAC) systems, air flow, gas detection (e.g., $CO_2$), and pressure drop over air filters. Medical applications include pressure sensing for inhalers, breathing devices, hearing aids or other differential gas pressure detection devices.

The invention uses a membrane-based pressure sensor. The membrane of the reference sensor includes one or more openings that facilitate gas flow into and out of the chamber. Specifically, the openings facilitate equalization of pressure in the chamber with a pressure outside the chamber connected to a second port.

A variety of membranes can be used to suit different applications. The device performance is dependent on the physical and structural properties of the membrane and the geometry of the chamber. The composition of the membrane and the membrane deposition parameters such as temperature and plasma power are selected to set the internal stress. The mechanical properties of the membrane, e.g., the mechanical stress, stiffness and membrane thickness, set the membrane rigidity and hence the sensitivity of the pressure sensor.

Thus, the invention can be used generally to measure a differential pressure between two inlet ports in order to determine a pressure difference over a filter, measure differences in water level, measure airflow, measure a relative pressure increase due to compression of a tube (seat occupancy, crash detection, etc.). In general, the invention is of interest for ultra-low power pressure sensing devices in which a differential output is required, with a small form factor. An integrated packaging solution can be provided.

The invention provides the following possible advantages:

small form factor (single die solution with integrated package);

low cost (small Si area due to integration on CMOS, for example with 4 extra masks;

Integration on CMOS enables combination of read-out circuit with other sensor modalities/functions;

the combination of absolute pressure sensing with differential pressure sensing is possible;

high sensitivity: small differential pressure can be measured, the range can be easily adapted in design upon changing the membrane diameter;

Thermal expansion correction of membranes is enabled allowing accurate temperature correction through differential read-out;

a fan out package is enabled which allows to connect macroscopic tubes to the area above pressure sensitive membrane;

the packaging solution allows the protection of sensitive membranes during processing and device operation; and the packaging solution allows to make Chip Scale Package (CSP) with low packaging cost, pressure sensor die can also be flipped upside down and ball bonded to the underlying PCB.

When forming a differential pressure sensor, the membranes do not need to be as hermetically sealed as for an absolute pressure sensor. This means a wide choice of membrane materials and closure arrangements is available. The membrane can for example be made thinner, which gives better pressure sensitivity.

Various modifications will be apparent to those skilled in the art.

The invention claimed is:

1. A differential pressure sensor, comprising:
a cavity having a base including a base electrode and a first membrane suspended above the base which includes a membrane electrode, wherein the first membrane is sealed with the first membrane;
a first pressure input port coupled to the space above the sealed first membrane;
a capacitive read out system for measuring the capacitance between the base electrode and membrane electrode;
an interconnecting channel between the cavity and a second pressure input port; and
a second cavity to the side of the cavity, with the cavity and the second cavity interconnected by the interconnection channel, wherein the second cavity comprises a second membrane which has at least one opening, wherein the at least one opening is coupled to the second pressure input port, wherein the second cavity has a base including a second base electrode and the second membrane includes a second membrane electrode, and wherein the capacitive read out system is for measuring the capacitance between the base electrode and membrane electrode and for measuring the capacitance between the second base electrode and the second membrane electrode.

2. A sensor as claimed in claim 1, wherein the first pressure input port is above the location of the cavity.

3. A sensor as claimed in claim 1, wherein the second membrane has a plurality of openings.

4. A sensor as claimed in claim 3 or 1, wherein the plan view area of the cavity is larger than the plan view area of the second cavity.

5. A sensor as claimed in claim 1, wherein the second pressure input port is above the location of the second cavity.

6. A sensor as claimed in claim 1, wherein the plan view area and shape of the cavity is the same as the plan view area and shape of the second cavity.

7. A sensor arrangement, comprising:
an integrated circuit; and
a sensor as claimed in one of claim 2 or 3-6 provided over the integrated circuit.

8. An arrangement as claimed in claim 7, wherein the integrated circuit comprises a CMOS circuit, and has a top metal layer, wherein the base electrode of the cavity connects to the top metal layer through vias to form an electrical connection to the base electrode.

9. An arrangement as claimed in claim 8, wherein the membrane electrode of the cavity connects to the top metal layer through vias to form an electrical connection to the membrane electrode.

10. An arrangement as claimed in claim 7, wherein a sealing layer is provided over the membrane of the cavity, and a port arrangement is provided over the sealing arrangement, wherein the port arrangement comprises a lid having a recess which sits over the first cavity area, and the first pressure input port is coupled to the recess.

11. An arrangement as claimed in claim 10, wherein the lid has a second recess which sits over the second cavity area, and the second pressure input port is coupled to the second recess.

12. An arrangement as claimed in claim 11, wherein the lid is constructed out of glass.

* * * * *

UNITED STATES PATENT AND TRADEMARK OFFICE
CERTIFICATE OF CORRECTION

PATENT NO. : 9,726,561 B2
APPLICATION NO. : 14/266281
DATED : August 8, 2017
INVENTOR(S) : Willem Frederik Adrianus Besling et al.

It is certified that error appears in the above-identified patent and that said Letters Patent is hereby corrected as shown below:

In the Claims

In Column 12, Line 15:
Replace "in one of claim 2 or 3-6", with --in one of claims 1-6--.

Signed and Sealed this
Fourteenth Day of November, 2017

Joseph Matal
*Performing the Functions and Duties of the
Under Secretary of Commerce for Intellectual Property and
Director of the United States Patent and Trademark Office*